United States Patent [19]

Millhoan

[11] 4,278,171
[45] Jul. 14, 1981

[54] STRAP RETAINER AND COMPRESSION BLOCK

[75] Inventor: William H. Millhoan, Delaware, Ohio

[73] Assignee: PPG Industries, Inc., Pittsburgh, Pa.

[21] Appl. No.: 62,603

[22] Filed: Aug. 1, 1979

[51] Int. Cl.³ ............................................. B65D 85/48
[52] U.S. Cl. ................................... 206/451; 206/454; 206/597; 211/41
[58] Field of Search ............... 206/449, 454, 448, 597, 206/451; 211/41

[56] References Cited

U.S. PATENT DOCUMENTS

| | | | |
|---|---|---|---|
| 2,116,381 | 5/1938 | Burke | 206/597 |
| 2,305,405 | 12/1942 | Burrell | 206/451 |
| 3,752,332 | 8/1973 | Theurer | 206/597 |
| 3,878,942 | 4/1975 | Hansen et al. | 206/454 |
| 3,955,676 | 5/1976 | Hansen et al. | 206/454 |
| 3,995,738 | 12/1976 | Rowley et al. | 206/451 |
| 4,014,435 | 3/1977 | Rowley et al. | 206/454 |
| 4,156,498 | 5/1979 | Miller | 206/481 |

FOREIGN PATENT DOCUMENTS

| | | | |
|---|---|---|---|
| 2234124 | 1/1974 | Fed. Rep. of Germany | 206/451 |
| 2307709 | 4/1975 | France | 206/454 |
| 589162 | 2/1978 | U.S.S.R. | 206/597 |
| 617345 | 7/1978 | U.S.S.R. | 206/454 |

Primary Examiner—Joseph Man-Fu Moy
Attorney, Agent, or Firm—Donald Carl Lepiane

[57] ABSTRACT

A strap retainer and compression block includes a pair of spaced plates mountable on each base of a pair of spaced A frame racks supporting glass sheets. The plates each have a pair of holes to selectively position the block on the base by aligning one of the holes in each plate with a hole in each base of the frame while biasing the block against the sheets. Thereafter a strap having one end secured to the block and the other end to the frame is tightened to urge the block toward the sheets.

7 Claims, 4 Drawing Figures

STRAP RETAINER AND COMPRESSION BLOCK

BACKGROUND OF THE INVENTION

1. Field of the Invention

This invention relates to a device for and method of securing sheets on racks.

2. Discussion of the Prior Art and Technical Problems

U.S. Pat. Nos. 3,878,942 and 4,014,435 teach the use of "A" and "L" shaped frames respectively for shipping loose glass sheets. The glass sheets are mounted in a generally vertical position on the frame and secured in position by straps or bindings. Normally the straps have one end secured to the top of the frames and the other end secured to the base of the frame. Lash boards between the straps and outermost glass sheet urge the sheets together against the vertical supporting surface of the frame.

Although the use of straps and lash boards is acceptable, there are drawbacks. For example, storing and/or disposing of the lash boards involves inventory cost and/or disposal problems respectively. Further, during shipment the transportation forces tend to move the bottom supported edges of the sheets away from the vertical supporting surface. Since the straps and lash boards uniformity apply a biasing force between the top and bottom edges of the sheets, there is no concentration of biasing force adjacent the bottom of the sheet where it is needed. It would be advantageous, therefore, to provide a securing system that does not have the drawbacks of the prior art securing system.

SUMMARY OF THE INVENTION

This invention relates to a strap and article securing assembly for use in combination with a rack of the type having a base for supporting articles. The securing assembly includes a shoe mounted on and secured to the base. The shoe has facilities for retaining a portion of a strap to secure the articles on the rack.

This invention also relates to a method of securing articles in position on a rack having a base. A shoe having a pair of holes is aligned with a hole on the base while engaging the adjacent article. Thereafter the articles are secured on the rack by urging the shoe against the adjacent article.

DESCRIPTION OF THE INVENTION

Figure 1:
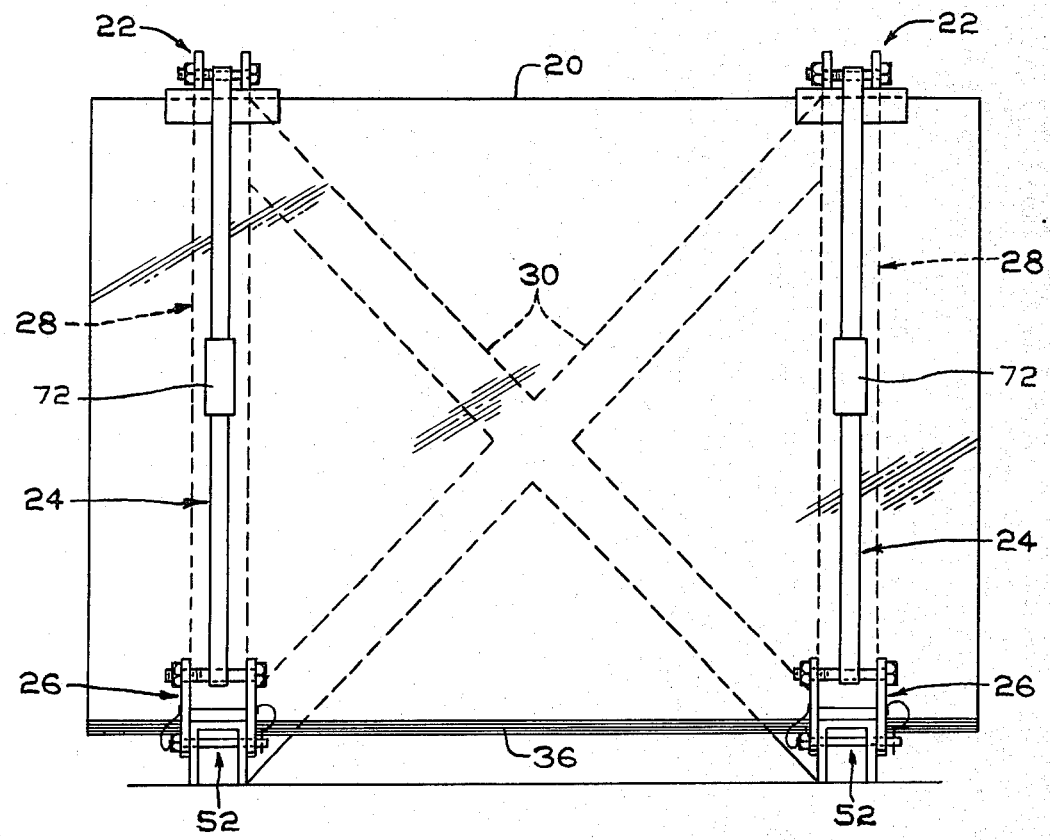
FIG. 1 is a front level view of a rack load with sheets, which sheets are secured on the rack by strap retainer and compression blocks of the instant invention.
Figure 2:
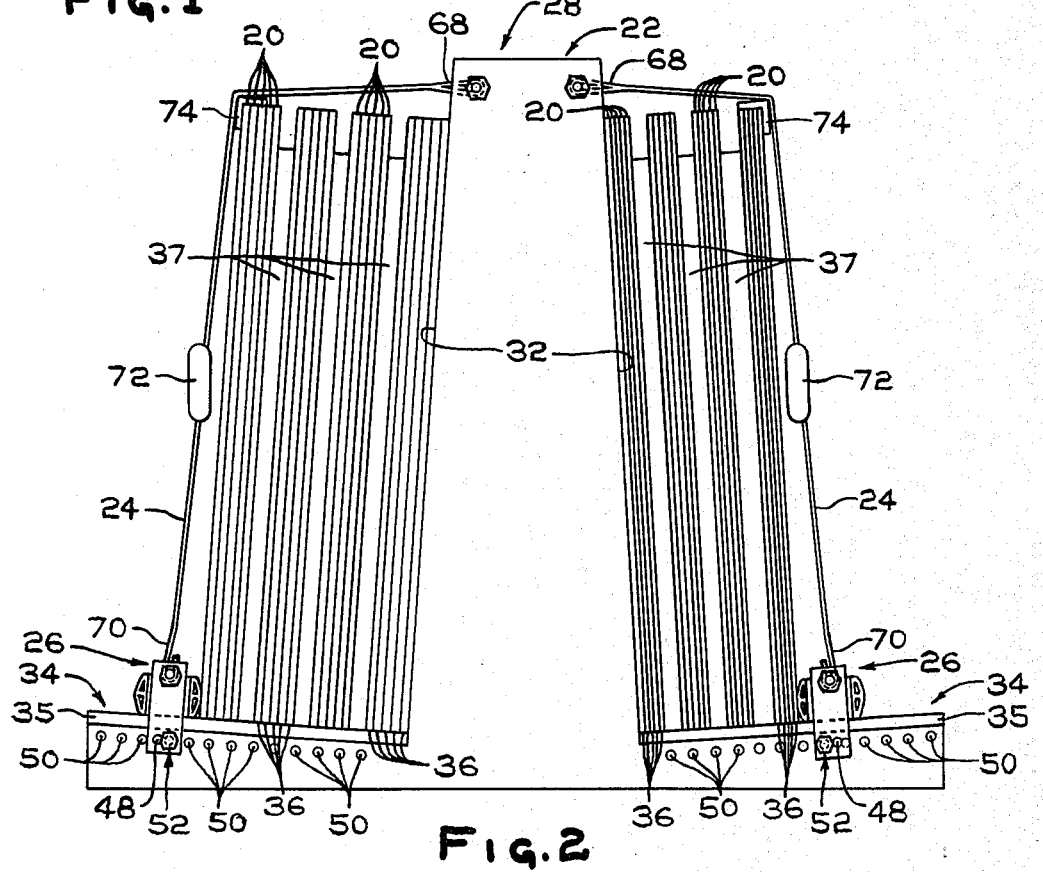
FIG. 2 is a side elevated view of the rack shown in FIG. 1.

In FIGS. 1 and 2 there are shown sheets 20 secured on frame or rack 22 by straps 24 and sheet retainer and compression block or device 26 incorporating features of the invention. In the following discussion the sheets 20 are glass sheets, however it will become apparent that the invention is not limited thereto and may be practiced on any type of sheet material, e.g., wood, metal, and/or plastic. The rack 22 shown in FIGS. 1 and 2 includes a pair of A frames 28 held in predetermined spaced relationship by a pair of cross struts 30. With specific reference to FIG. 2 each of the A frames 28 have a pair of generally vertical supporting surfaces 32 and horizontal surfaces or bases 34 for supporting the sheets at their bottom edge 36 in a generally vertical position. Racks similar to those shown in FIGS. 1 and 2 may be found in U.S. Pat. Nos. 3,489,178 and 3,878,942 which teachings are hereby incorporated by reference. As will be appreciated from the following discussion, the invention is not limited to the type of frame or rack employed to support the sheets 20. For example, "L" shaped racks of the type taught in U.S. Pat. No. 4,014,435, which teachings are hereby incorporated by reference, may be used in the practice of the invention.

Figure 3:
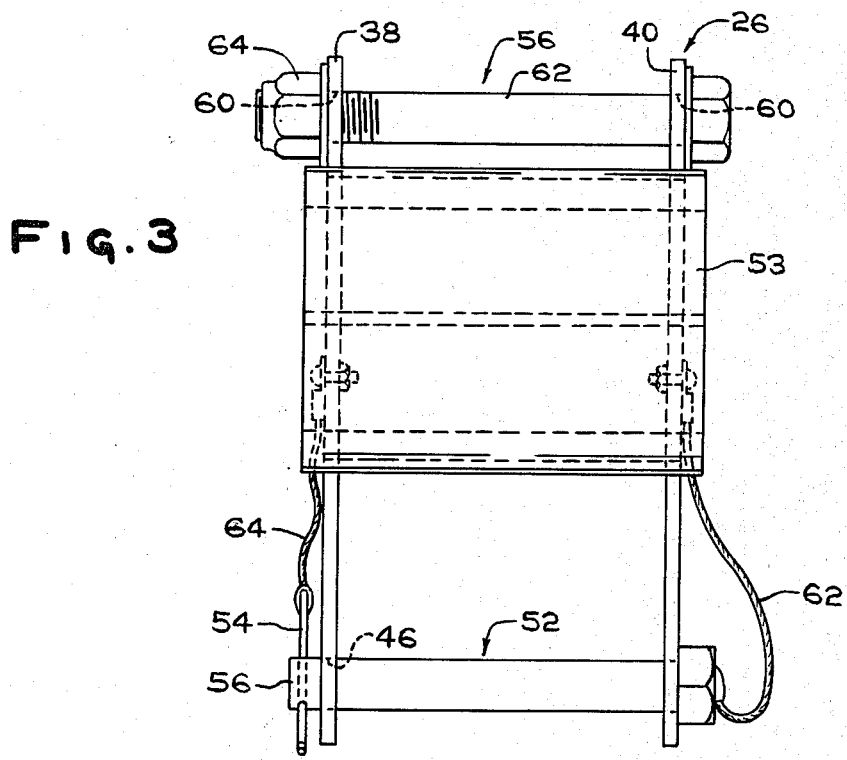
FIG. 3 is side elevated view of a strap retainer and compression block of the instant invention.
Figure 4:
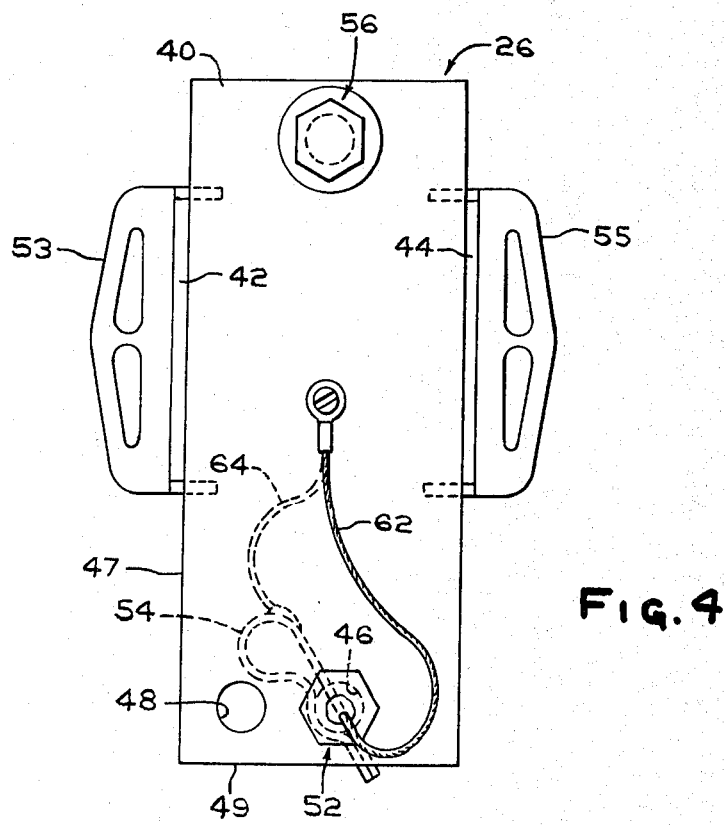
FIG. 4 is an elevated view of another side of the strap retainer and compression block of the instant invention.

With reference to FIGS. 2-4, the sheet retaining device 26 of the instant invention includes a first pair of plates 38 and 40 held in spaced relationship by a second pair of plates 42 and 44 (see FIG. 4) to mount the device about a base as shown in FIGS. 1 and 2. The first and second pair of plates provide a shoe which is secured on the base of the rack to prevent movement of the sheets in a manner to be discussed below. For example, one of holes 46 or 48 in the plates 38 and 40 of the device are aligned with one of holes 50 in the base 34 to receive bolt 52. The bolt 52 may be held in position by a pin 54 passing through the end 56 of the bolt 52 as shown in FIG. 3. The plates 38 and 40 preferably are provided with a pair of holes 46 and 48 each on a different center to center spacing with the adjacent side of the plate 38 or 40. In this manner the device 26 can be selectively positioned on the base 34 against the sheets to provide minimal displacement of the device 26 or bottom edge portion of the sheet.

In the instance when the sheets are easily marred, for example glass sheets, it is recommended that the plates 42 and/or 44 which face and contact the stacked sheets 20 have a resilient cover 53 and 55 respectively, for example, a molded piece of rubber. The upper portion of the plates 38 and 40 as mounted on the base contain a bolt and nut assembly 56 (see FIG. 3) for retaining an end of the strap 24 with the other end of the strap secured to the rack in any convenient manner.

The sheet retaining device 26 of the instant invention may be used for different load thickness by selectively mounting the device 26 on the base in a first position or second opposite position and/or aligning either hole 46 or 48 with a hole 50 on the base of the rack. The tension applied to the device 26 by the strap 24 urges the device 26 against the bottom edge 36 of the sheet to concentrate a biasing force there against. Since the device 26 can be selectively positioned to provide a minimum amount of sheet displacement, the sheets are held in a tight pack to minimize the sheets hitting one another or from sliding off the rack.

DETAILED DESCRIPTION OF THE INVENTION

Sheet retaining device 26 of the instant invention is used in combination with a strap 24 to secure glass sheet 20 on A frames 22. The A frames 22 held in spaced relationship by rigid bars 30 each include a slanted support surface 32 normal to a base 34 having a rubber pad 35 to prevent damage to the supported edges 36 of the glass sheets. Glass sheets to be stacked on one side of the A frames, e.g. the right side as viewed in FIG. 2, each have a thickness of about ⅛ inch (0.32 centimeter), a length of about 15 feet (4.5 meters) and a height of about 10 feet (3 meters). Groups of five sheets are stacked in facing relationship to one another and separated by lash board 37 to provide ease of loading and unloading the glass packs from the A frames in any convenient manner for example, as taught in U.S. Pat. No. 4,066,287, which teachings are hereby incorporated by reference. The sheets on the right side of the A frame as viewed in FIG. 2 are similar in height and width but each have a thickness of about 3/16 inch (0.48 centimeter) and are similarly stacked in packs of 5 sheets and separated by lash boards 37. The base of each A frame has 13 holes 50 having their central axis generally parallel to the supporting surface of the A frames. The holes 50 are on a center to center spacing of about 2¼ inches (5.72 centimeters) and have an inside diameter of about 21/32 inch (1.68 centimeters).

A sheet retaining device 26 of the instant invention is provided for each base and each includes a pair of plates 38 and 40 each having a thickness of about 3/16 inch (0.48 centimeter), a length of about 3½ inches (8.89 centimeter) and a height of about 8½ inches (21.6 centimeters). The plates 38 and 40 are maintained in spaced relationship by a second pair of plates 42 and 44 each having a thickness of about 3/16 inch (0.48 centimeter), a height of about 3½ inches (8.89 centimeters) and a length of about 5 inches (12.70 centimeters). The plates 38 and 40 are on a center to center spacing such that the inside surfaces are about 4 ⅝ inches (11.76 centimeters) apart. With reference to FIG. 3, each of the plates 38 and 40 have a hole 60 for receiving a nut and bolt assembly 56. The assembly 56 includes a bolt 62 having a diameter of about ⅝ inch (1.60 centimeters) and a length of about 6 inches (0.15 meter) secured in holes 60 by nut 64. The bolt 62 is engaged by end 70 of the strap assembly 24 in a manner to be discussed below. The bottom portion of the plates are provided with two holes 46 and 48 each about ¾ inch (1.92 centimeters) in diameter with one hole e.g., hole 48 on a center to center spacing of about ¾ inches (1.92 centimeters) from the side 47 and about ¾ inch (1.92 centimeters) from bottom edge 49 with the second hole, e.g., hole 46 spaced about 2 inches (5.08 centimeters) from the side 47 and about ¾ inch (12 centimeters) from the bottom edge 49. A bolt 52 having about a ⅝ inch (1.60 centimeter) outside diameter and a length of about 5½ inches (13.97 centimeter) is detachably secured to a plate by a flexible plastic cable and nut assembly 62. The bolt 52 has about 5/16 inch (0.80 centimeter) hole at the opposite end 56 for receiving a 5/32 inch (0.40 centimeter) diameter hitch pin 54 secured to the shoe by a plastic cable and bolt assembly 64.

Each of the plates 42 and 44 are provided with a rubber cushion 52 and 54, respectively, to prevent marring of the glass sheets. After the sheets are loaded on one side of the A frame, for example, the sheets are loaded on the left side of the A frame as shown in FIG. 2. A device 26 is mounted on each base and urged to move the rubber cushion against bottom portion of the sheets. Hand pressure is applied to align one of the holes 46 or 48 at the bottom of the device with a hole 50 formed in the base. If alignment is not obtained without excessive pressure, the shoe is rotated and the holes aligned afterwhich the bolt 52 is passed through the aligned holes and secured in position by the hitch pin 54. The process is repeated for the opposite base, thereafter a strap 24 having its end 68 secured to the top of the A frame passing over the sheets and has its hooked end 70 engaging to the bolt 62. A ratchet assembly 72 is operated to apply tension to the strap 24 to urge the sheets against the back support of the A frame and to pivot the shoe against the outermost sheet. To prevent cutting of the straps, a corner pad 74 is mounted between the strap and the corner of the outermost sheet. Sheets 20 are mounted on the other side of the A frame and the above process repeated to secure the sheets in position.

The sheets may be removed from the A frame in the opposite manner in which they were mounted thereon. As can now be appreciated, the above example is presented for illustration purposes only and is not limiting to the invention.

What is claimed is:

1. A strap and sheet securing assembly for use in combination with a rack of the type have a backwall mounted on a base for supporting sheets in a generally vertical position with bottom edge portion of the sheets supported on the base and strap means for securing the sheets on the rack, said securing assembly comprising:
   a shoe having a first sheet engaging surface and a second sheet engaging surface spaced from the first sheet engaging surface;
   first means for securing said shoe at a predetermined position on the base with the first sheet engaging surface facing the backwall and spaced a first distance therefrom;
   second means for securing said shoe at the predetermined position on the base with the second sheet engaging surface facing the backwall and spaced a second distance therefrom different than the first distance; and
   means mounting said shoe for retaining a portion of said strap means.

2. The securing assembly as set forth in claim 1 wherein said engaging surfaces are opposite to one another.

3. The securing assembly as set forth in claim 1 wherein said sheet engaging surfaces are opposite to one another and said first securing means includes:
   a first hole in each of said plates, said first hole of each plate aligned with one another and spaced a predetermined distance from said first sheet engaging surface;
   said second securing means includes a second hole in each of said plates, said second hole of each plate aligned with one another and spaced a predetermined distance from said second sheet engaging surface different than the distance between said first holes and said first sheet engaging surface; and
   said first and second securing means further includes:
   at least one hole in the base; and
   means insertable in the one of said first or second holes of said shoe aligned with said at least one hole of the base.

4. The securing assembly as set forth in claim 1 wherein the rack is a pair of A frames held in spaced relation to one another, each frame having a supporting surface and a base on each side thereof, each base having a plurality of holes and the sheets are glass sheets.

5. The securing assembly as set forth in claim 4 or 1 wherein said first and second securing means include:
   a pair of plates held in spaced relation to one another a distance sufficient to mount said shoe on the base.

6. The securing assembly as set forth in claim 5 wherein said retaining means includes an elongated member mounted between said pair of plates.

7. The securing assembly as set forth in claim 3 wherein:
   said plates of said shoe are a first pair of plates held in spaced relation by a second pair of plates;
   said sheet engaging surfaces each include a resilient compressible member mounted on each of said second plates; and
   said retaining means include a bolt secured between said first pair of plates and engagable with a portion of the strap means.

* * * * *

UNITED STATES PATENT AND TRADEMARK OFFICE
CERTIFICATE OF CORRECTION

PATENT NO. : 4,278,171

DATED : July 14, 1981

INVENTOR(S) : William H. Millhoan

It is certified that error appears in the above—identified patent and that said Letters Patent are hereby corrected as shown below:

Under References Cited, Foreign Patent Documents;

French Patent No. 2,307,709 is dated 4/1975, should be dated 4/1971.

Signed and Sealed this

Thirteenth Day of October 1981

[SEAL]

Attest:

GERALD J. MOSSINGHOFF

Attesting Officer    Commissioner of Patents and Trademarks